US012080853B2

(12) United States Patent
Morioka et al.

(10) Patent No.: US 12,080,853 B2
(45) Date of Patent: Sep. 3, 2024

(54) BATTERY AND PRODUCTION METHOD FOR BATTERY

(71) Applicant: Panasonic Intellectual Property Management Co., Ltd., Osaka (JP)

(72) Inventors: Kazuhiro Morioka, Osaka (JP); Akira Kawase, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 585 days.

(21) Appl. No.: 17/341,467

(22) Filed: Jun. 8, 2021

(65) Prior Publication Data

US 2021/0296705 A1 Sep. 23, 2021

Related U.S. Application Data

(63) Continuation of application No. PCT/JP2019/046735, filed on Nov. 29, 2019.

(30) Foreign Application Priority Data

Dec. 28, 2018 (JP) ................................ 2018-248609

(51) Int. Cl.
*H01M 10/0585* (2010.01)
*H01M 10/0525* (2010.01)
*H01M 10/0562* (2010.01)

(52) U.S. Cl.
CPC ... *H01M 10/0585* (2013.01); *H01M 10/0525* (2013.01); *H01M 10/0562* (2013.01); *H01M 2300/0068* (2013.01)

(58) Field of Classification Search
CPC ......... H01M 10/0585; H01M 10/0525; H01M 10/0562; H01M 2300/0068
See application file for complete search history.

(56) References Cited

U.S. PATENT DOCUMENTS

2010/0032347 A1* 2/2010 Ring .................... B01J 8/0453
422/600
2010/0323247 A1 12/2010 Takeshi et al.
(Continued)

FOREIGN PATENT DOCUMENTS

| EP | 3751657 | 12/2020 |
| JP | 2004-087267 | 3/2004 |
| JP | 2006-128014 | 5/2006 |

(Continued)

OTHER PUBLICATIONS

JP 2016134254 MT (Year: 2016).*
International Search Report of PCT application No. PCT/JP2019/046735 dated Feb. 10, 2020.

*Primary Examiner* — Alexander Usyatinsky
(74) *Attorney, Agent, or Firm* — Rimon P.C.

(57) ABSTRACT

A battery according to the present disclosure includes a first electrode, a second electrode, and a solid state electrolyte layer disposed between the first electrode and the second electrode, the solid state electrolyte layer containing at least a solid state electrolyte and at least carbon atoms and including a carbon unevenly distributed layer. The concentration of the carbon atoms in the carbon unevenly distributed layer is higher than the concentration of the carbon atoms in a region of the solid state electrolyte layer excluding the carbon unevenly distributed layer.

12 Claims, 6 Drawing Sheets

(56) References Cited

U.S. PATENT DOCUMENTS

2017/0054181 A1    2/2017  Sasaki
2018/0277907 A1*   9/2018  Iwasaki ................ H01M 4/485

FOREIGN PATENT DOCUMENTS

| | | | |
|---|---|---|---|
| JP | 2009-187783 | | 8/2009 |
| JP | 2011-086554 | | 4/2011 |
| JP | 2016-134254 | | 7/2016 |
| JP | 2016134252 | * | 7/2016 |
| JP | 2016134254 | * | 7/2016 |
| JP | 2017-041439 | | 2/2017 |
| JP | 2018-163870 | | 10/2018 |
| WO | 2019/151363 | | 8/2019 |

* cited by examiner

BATTERY AND PRODUCTION METHOD FOR BATTERY

BACKGROUND

1. Technical Field

The present disclosure relates to a battery and a production method for a battery.

2. Description of the Related Art

Japanese Unexamined Patent Application Publication No. 2006-128014 and Japanese Unexamined Patent Application Publication No. 2011-086554 disclose an all-solid state battery in which a solid state electrolyte layer includes a layer containing carbon.

SUMMARY

In the related art, batteries having high reliability are desired.

In one general aspect, the techniques disclosed here feature a battery including a first electrode, a second electrode, and a solid state electrolyte layer disposed between the first electrode and the second electrode, the solid state electrolyte layer containing at least a solid state electrolyte and at least carbon atoms and including a carbon unevenly distributed layer. The concentration of the carbon atoms in the carbon unevenly distributed layer is higher than the concentration of the carbon atoms in a region of the solid state electrolyte layer excluding the carbon unevenly distributed layer.

According to one aspect of the present disclosure, a battery having high reliability that is capable of, for example, reducing the risk of a short circuit can be realized.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
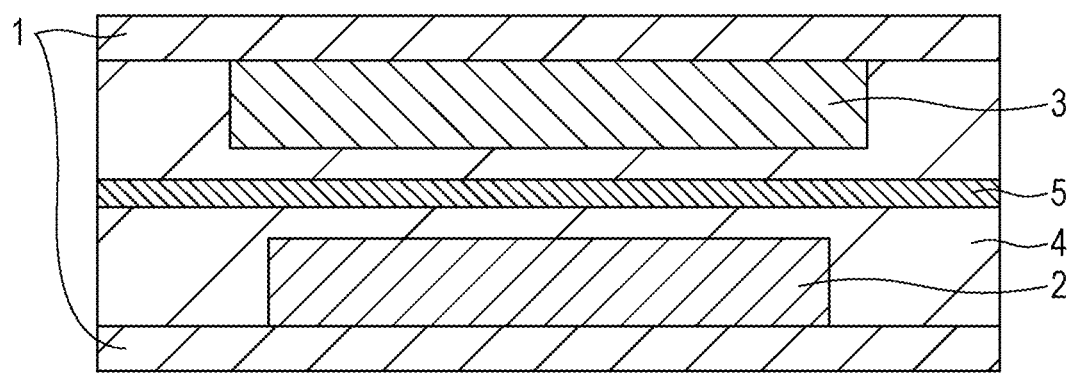
FIG. 1 is a schematic sectional view of an all-solid state battery which is an example of a battery according to a first embodiment.

Underlying Knowledge Forming Basis of the Present Disclosure

Due to advantages in terms of a large area and continuous and mass production capabilities, the application of a coating process to the production of all-solid state batteries has been examined. In the coating process, first, powder is dispersed in a solvent to thereby form a slurry. Next, a coating film is formed from the slurry on a base material using a technique such as screen printing or die coating. The solvent in the obtained coating film is volatilized, for example, by a heat process such as heating in a dry furnace to thereby obtain a dried film. During slurry formation, a binder is commonly added to the slurry, for example, to obtain a slurry having a degree of viscosity suited to the coating process and to obtain the strength of a dried film and the adhesion between the dried film and a base material.

A binder is conceived to be non-essential for the battery characteristics of an all-solid state battery. However, a binder is necessary when film formation is performed using the coating process. When the coating process is used, powder is dispersed in a solvent to thereby form a slurry, and the slurry is applied. To balance good coatability and good film quality, it is important to make the slurry retain a certain degree of viscosity. To make the slurry retain viscosity, a binder is also contained in the slurry using a dispersion process. Here, by controlling the dispersion process, the binder can be uniformly dispersed in the slurry together with the powder. Thus, by controlling the dispersion process, the content of the binder in the slurry can be controlled and minimized.

For example, when a solid state electrolyte layer of an all-solid state battery is formed by the coating process, a solid state electrolyte slurry in which the powder of a solid state electrolyte is dispersed in a solvent is formed. A coating film is formed from this solid state electrolyte slurry on electrodes which are a base material (i.e., a positive electrode and a negative electrode) by the coating process. Each of the electrodes may be constituted by, for example, a current collector and an electrode layer disposed on the current collector (i.e., a positive electrode layer or a negative electrode layer). Each electrode layer can also be formed by the coating process. A dried film of each electrode layer obtained by the coating process may be pressed, before the solid state electrolyte slurry is applied, to enhance the battery performance.

When in the state of a slurry, the binder contained in the solid state electrolyte layer is uniformly dispersed in the solvent together with the solid state electrolyte particles. When in the state of a dried film obtained by drying the coating film of the slurry applied to each electrode layer, the binder obtains the strength as a film by being present between the solid state electrolyte particles and causing the particles to adhere to one another. The binder contained in the solid state electrolyte layer is normally an organic binder. Thus, the solid state electrolyte layer formed by the coating process normally contains carbon atoms derived from an organic compound forming a binder.

After the solid state electrolyte layer is formed on each of the positive electrode and the negative electrode by the coating process, the solid state electrolyte layer on the positive electrode and the solid state electrolyte layer on the negative electrode are stacked face-to-face with each other, and the obtained layered body is pressed in the layered direction. Thus, the solid state electrolyte layer on the positive electrode and the solid state electrolyte layer on the negative electrode are joined to thereby form an all-solid state battery. Here, the joining interface is formed from a surface of the solid state electrolyte layer formed on the positive electrode layer and a surface of the solid state electrolyte layer formed on the negative electrode layer. Due to pressing, the resulting solid state electrolyte layer has an enhanced filling rate and is densified, but simultaneously becomes hard and brittle. Thus, when spring back and/or an impact from the outside occur during pressing, for example, a crack may occur in the solid state electrolyte layer, potentially resulting in the collapse of a portion of the solid state electrolyte layer. When a portion of the solid state electrolyte layer is chipped or a crack occurs in the solid state electrolyte layer, the function of insulating the positive electrode and the negative electrode from each other is deteriorated, potentially resulting in a short circuit.

As described above, when a solid state electrolyte layer of an all-solid state battery is formed by the coating process, the solid state electrolyte layer may be pressurized to be joined to electrodes, to be joined to each other, and/or to increase the filling rate. The pressurized solid state electrolyte layer may become hard and brittle while the filling rate is increased. The solid state electrolyte layer has the function of insulating the positive electrode and the negative electrode from each other. Thus, when, due to pressurization, a crack occurs in the solid state electrolyte layer or chipping occurs at an end of the solid state electrolyte layer, the risk of a short circuit is increased. Accordingly, it is an object to obtain the strength of a joining portion of such a solid state electrolyte layer.

The present inventors have conducted intensive studies on the object. As a result, the present inventors have newly found that, when a layer in which the adhesive force between powder particles is strengthened by a binder is present near the joining interface of a solid state electrolyte layer, the film strength is maintained at a high level even after the solid state electrolyte layer is densified due to pressurization, thereby enabling the decrease in the risk of a short circuit.

When a layer strengthened by a binder is formed at the joining interface, it is conceivable to apply to each solid state electrolyte layer a slurry containing the binder as a separate layer and to use this layer as an adhesion layer. However, when formed by this method, it is conceivable that the resulting layer containing the binder becomes a layer formed from the components of the binder being evenly connected with one another. That is, it is conceivable that, due to the components of the binder being evenly connected with one another, a continuous carbon-containing layer spreading two-dimensionally in each solid state electrolyte layer is formed. The carbon atoms in this carbon-containing layer are derived from an organic compound forming the binder. This carbon-containing layer becomes resistance to the conduction of ions (e.g., lithium ions), causing a deterioration of the battery characteristics. Furthermore, when the slurry containing the binder is applied to each solid state electrolyte layer as a separate layer, the distribution of the binder is limited to only the outermost surface of each solid state electrolyte layer formed on the corresponding electrode layer. Thus, it is presumed that the enhancement of the strength is limited to only the joining interface of the resulting solid state electrolyte layer.

As a result of repeatedly conducting further intensive studies, the present inventors have succeeded in unevenly distributing a binder to a surface of each solid state electrolyte layer during drying after each solid state electrolyte layer is applied to the corresponding electrode layer. Specifically, by using the convection in the thickness direction of each solid state electrolyte layer under drying, the binder has been unevenly distributed to the surface of each solid state electrolyte layer. It has been found that the binder can be unevenly distributed to near the surface by changing the convection status in the thickness direction of each solid state electrolyte layer with various heating methods such as hot plate heating and far-infrared heating, a combination of vacuum drying therewith, and changes in conditions such as the drying time and the rate of temperature increase.

Figure 4A:
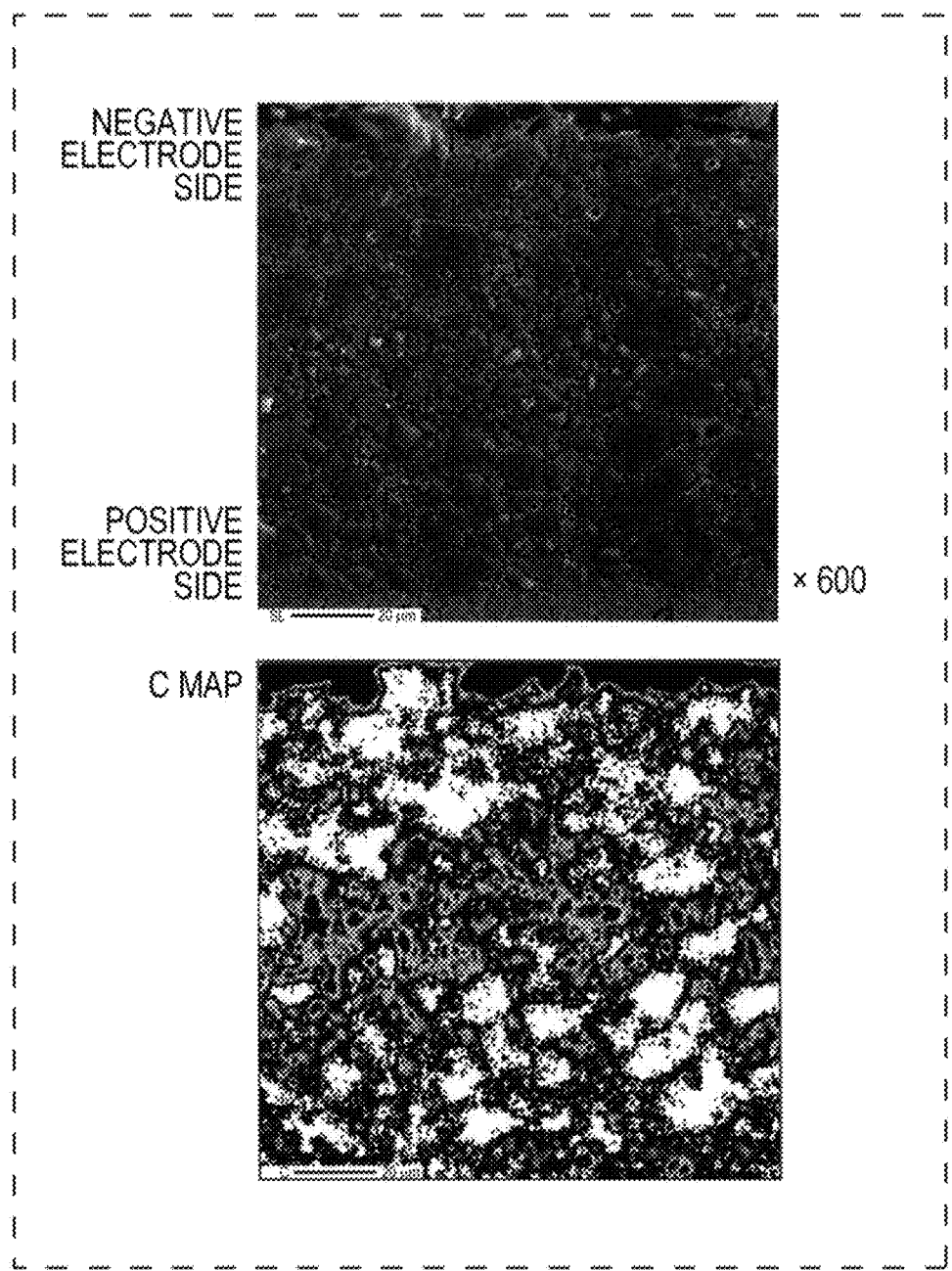
FIG. 4A presents a scanning electron microscope (SEM) image of a section of a battery formed in Example and the results of a carbon mapping analysis of the section.
Figure 4B:
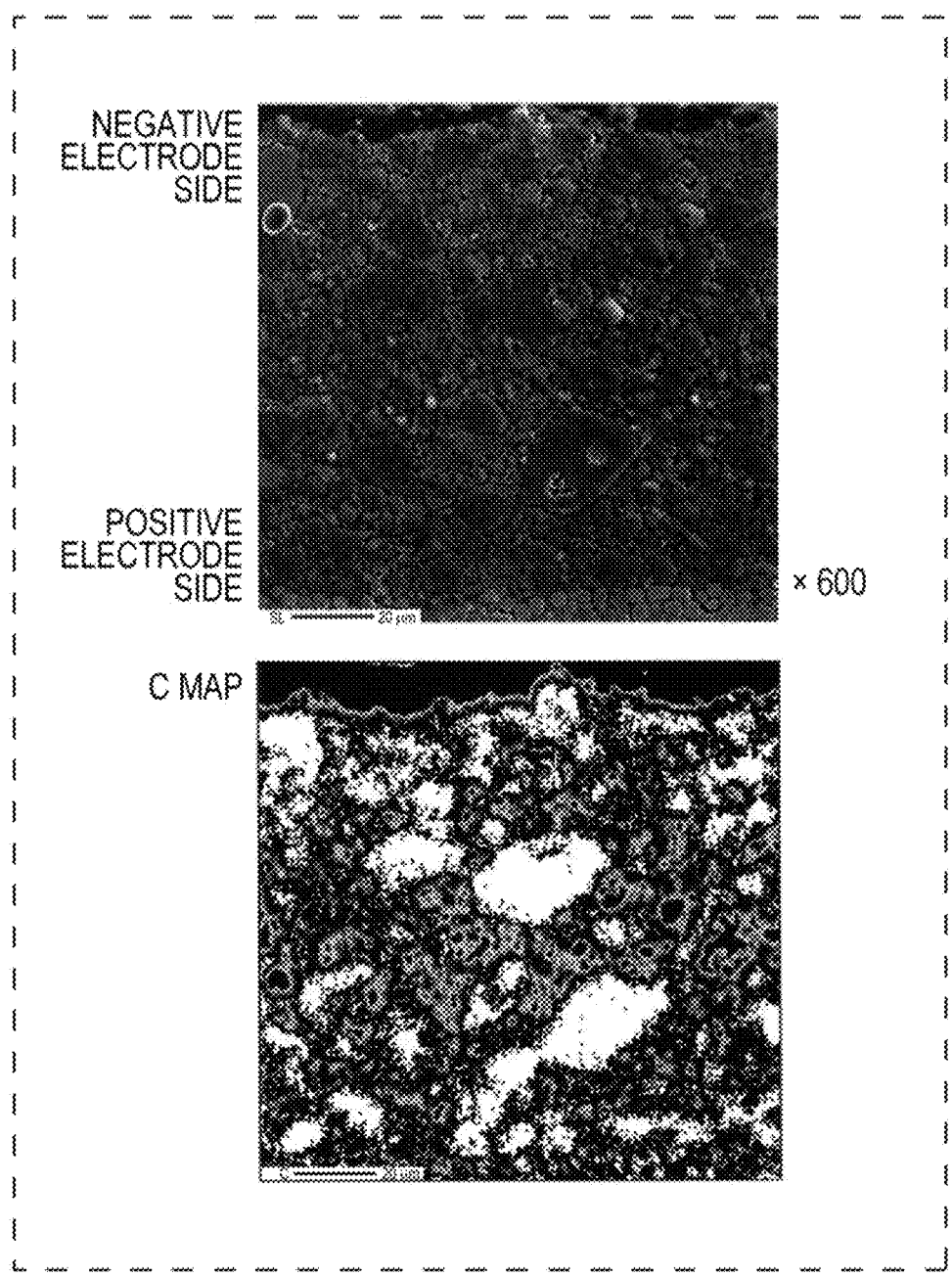
FIG. 4B presents another SEM image of the section of the battery formed in Example and the results of the carbon mapping analysis of the section.
Figure 5A:
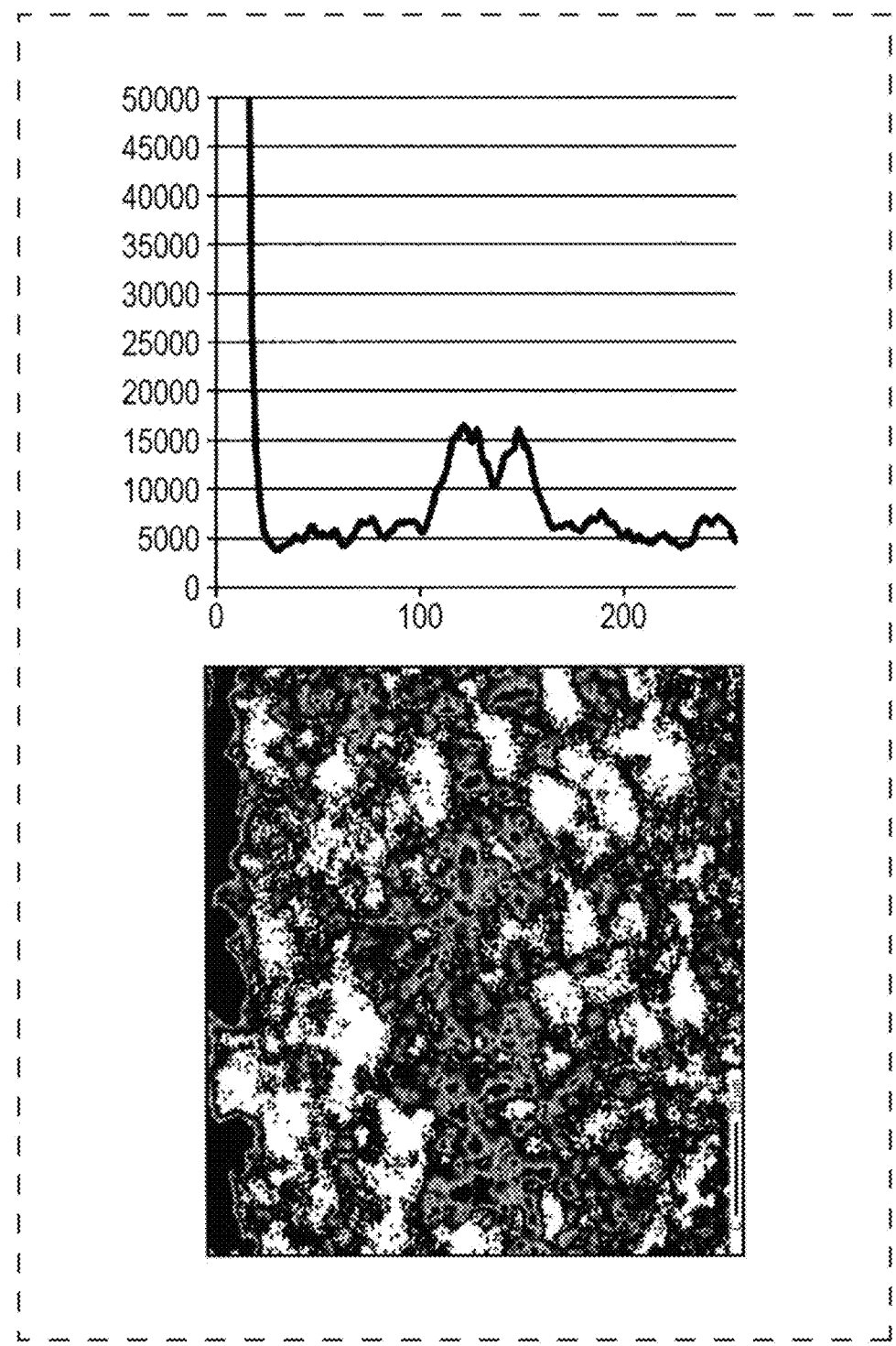
FIG. 5A presents the results of the carbon mapping analysis of the section of the battery formed in Example and a graph quantifying the carbon mapping intensity.
Figure 5B:
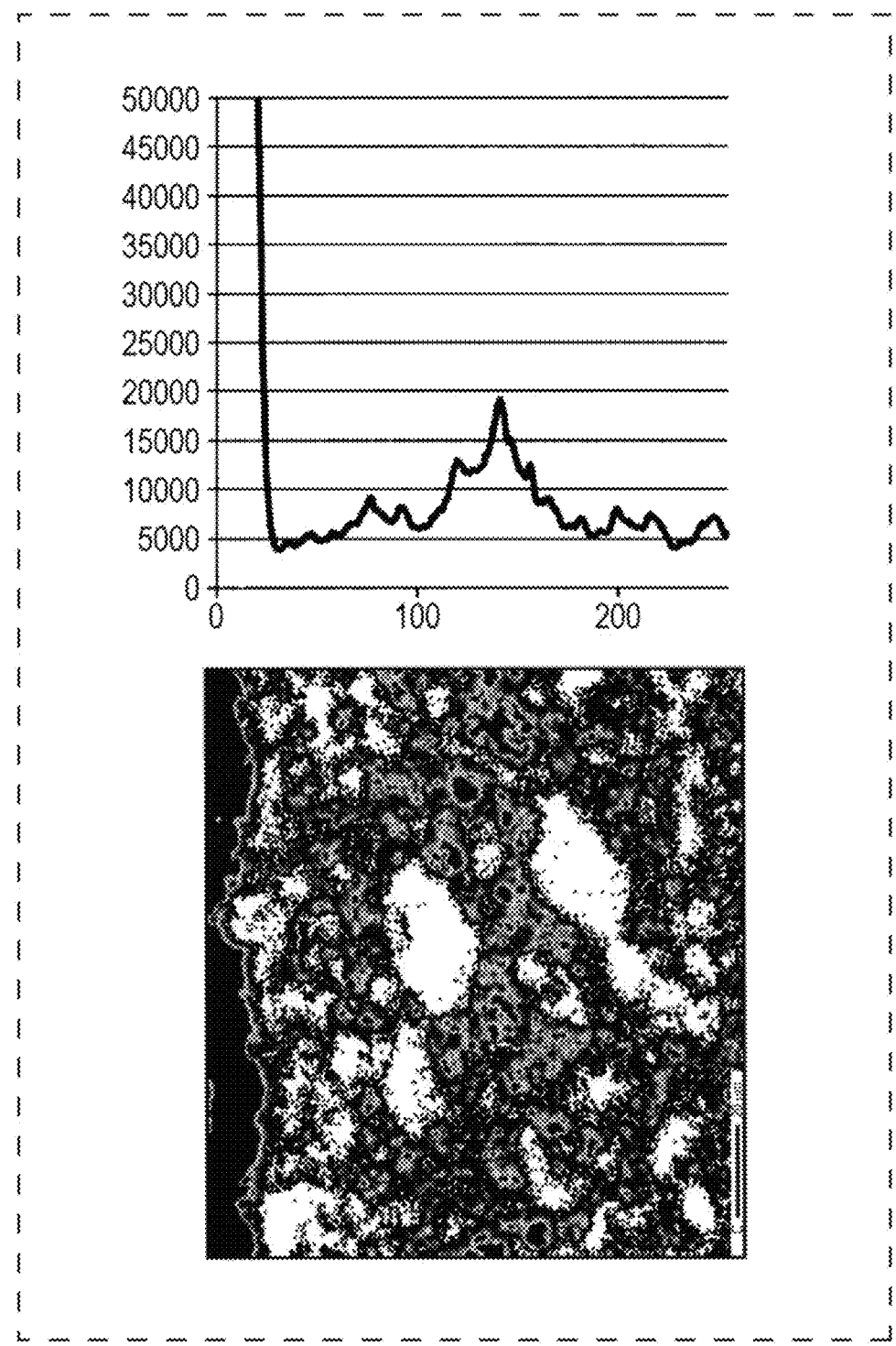
FIG. 5B presents the results of the carbon mapping analysis of the section of the battery formed in Example and a graph quantifying the carbon mapping intensity.

The unevenly distributed state of the binder can be confirmed, for example, by cutting an all-solid state battery after being subjected to joint pressing with a cutter or the like, polishing the cut section with a cross section polisher (CP) or the like, and performing a carbon mapping analysis of the section of the resulting solid state electrolyte layer using an electron probe micro analyzer (EPMA). The unevenly distributed state of the binder in the solid state electrolyte layer formed by using the method where the binder is unevenly distributed to the surface of each solid state electrolyte layer during drying as described above can be confirmed, for example, with a resulting solid state electrolyte layer in Example described below. FIGS. 4A and 4B present SEM images of a section of a battery formed in Example and the results of a carbon mapping (C map) analysis of the section. FIGS. 5A and 5B present the results of the carbon mapping analysis of the section of the battery formed in Example and graphs quantifying the carbon mapping intensity.

FIGS. 4A and 4B and FIGS. 5A and 5B reveal that, in the solid state electrolyte layer, in a position apart from electrode layers, near the center in the thickness direction, a carbon unevenly distributed layer which is a region having carbon unevenly distributed therein is present. It is revealed that this carbon unevenly distributed layer is not a continuous layer in which the binder components are evenly connected with one another, but is constituted by a region in which a plurality of carbon unevenly distributed portions having a diameter size of greater than or equal to several μm and less than or equal to several 10s μm are two-dimensionally assembled. A carbon unevenly distributed layer in this structure does not largely inhibit the conduction of ions (e.g., lithium ions). Thus, according to the solid state electrolyte layer including a carbon unevenly distributed layer in this structure, a high strength of a solid state electrolyte layer formed by the coating process can be realized without largely deteriorating the ionic conductivity.

Hereafter, embodiments of the present disclosure will be described with reference to the drawings.

First Embodiment

A battery according to a first embodiment includes a first electrode, a second electrode, and a solid state electrolyte layer disposed between the first electrode and the second electrode. The solid state electrolyte layer contains at least a solid state electrolyte and at least carbon atoms and includes a carbon unevenly distributed layer. The concentration of the carbon atoms in the carbon unevenly distributed layer is higher than the concentration of the carbon atoms in a region of the solid state electrolyte layer excluding the carbon unevenly distributed layer. The carbon unevenly distributed layer is, in other words, a carbon-rich layer constituted by a region having a high concentration of carbon atoms.

In the battery according to the first embodiment, the solid state electrolyte layer includes the carbon unevenly distributed layer. The carbon unevenly distributed layer is unlikely to be collapsed, for example, even after being subjected to a process such as pressurization, and can have high strength. That is, the carbon unevenly distributed layer can have high collapse resistance strength. Thus, because of including the carbon unevenly distributed layer, the solid state electrolyte layer can have high strength, for example, even in the case where the solid state electrolyte layer has been formed by the coating process. Accordingly, the battery according to the first embodiment, for example, reduces the risk of a short circuit and is capable of realizing high reliability.

In the battery according to the first embodiment, the carbon atoms contained in the solid state electrolyte layer and the carbon unevenly distributed layer are derived from, for example, an organic binder used when the solid state electrolyte layer is formed by the coating process. That is, in this case, the carbon atoms contained in the solid state electrolyte layer and the carbon unevenly distributed layer are not amorphous carbon but carbon forming an organic compound, and may be bonded to, for example, hydrogen atoms.

In the battery according to the first embodiment, the carbon unevenly distributed layer is, for example, in the solid state electrolyte layer, constituted by a region in which a plurality of unevenly distributed portions are two-dimensionally assembled, the unevenly distributed portions having the carbon atoms unevenly distributed therein. According to this structure, the battery according to the first embodiment is not only capable of realizing high reliability but also keeps the deterioration of the ionic conductivity due to the carbon unevenly distributed layer small, thereby being capable of obtaining high ionic conductivity.

In the battery according to the first embodiment, the carbon unevenly distributed layer may be neither in contact with the first electrode nor in contact with the second electrode. According to this structure, the battery according to the first embodiment is capable of realizing high reliability.

In the battery according to the first embodiment, the carbon unevenly distributed layer may be exposed at a side surface of the solid state electrolyte layer. In this structure, the carbon unevenly distributed layer capable of having high collapse resistance strength is exposed at a side surface of the solid state electrolyte layer. Thus, according to this structure, the battery according to the first embodiment is capable of preventing or reducing the collapse of the solid state electrolyte from the side surface with higher certainty, thereby being capable of realizing high reliability.

In the battery according to the first embodiment, the carbon unevenly distributed layer may have a thickness of greater than or equal to 10 μm and less than or equal to 50 μm. According to this structure, the battery according to the first embodiment keeps the deterioration of the ionic conductivity due to the carbon unevenly distributed layer smaller, thereby being capable of obtaining higher ionic conductivity.

In the battery according to the first embodiment, the first electrode may include a first electrode layer containing a first electrode active material and the second electrode may include a second electrode layer containing a second electrode active material. In this case, the carbon unevenly distributed layer may have a thickness of greater than or equal to 0.1 times and less than or equal to 0.5 times the distance between the first electrode layer and the second electrode layer. According to this structure, the battery according to the first embodiment is capable of effectively realizing both high reliability and high ionic conductivity.

In the battery according to the first embodiment, the concentration of the carbon atoms in the carbon unevenly distributed layer may be greater than or equal to 1.5 times and less than or equal to 10 times and may be greater than or equal to 2 times and less than or equal to 5 times the concentration of the carbon atoms in the region of the solid state electrolyte layer excluding the carbon unevenly distributed layer. According to this structure, the battery according to the first embodiment is capable of effectively realizing both high reliability and high ionic conductivity. In the first embodiment, the concentration of the carbon atoms in the carbon unevenly distributed layer is determined by, first, cutting the battery according to the first embodiment in the thickness direction, polishing the cut section with a CP or the like, performing a carbon mapping analysis of the cut section using an EPMA, and quantifying the obtained carbon mapping intensity. The concentration of the carbon atoms in the region of the solid state electrolyte layer excluding the carbon unevenly distributed layer is based on the lowest carbon concentration among the carbon concentrations in a region that is in the solid state electrolyte layer and that is not the carbon unevenly distributed layer.

In the battery according to the first embodiment, the carbon unevenly distributed layer may contain the solid state electrolyte contained in the solid state electrolyte layer in addition to the carbon atoms. When the carbon unevenly distributed layer contains not only the carbon atoms but also the solid state electrolyte, the battery according to the first embodiment is capable of realizing higher ionic conductivity.

In the battery according to the first embodiment, the carbon unevenly distributed layer may further contain Li atoms. According to this structure, the conduction of Li ions is not inhibited.

In the battery according to the first embodiment, the first electrode may be a positive electrode and the second electrode may be a negative electrode or the first electrode may be a negative electrode and the second electrode may be a positive electrode. To the first electrode and the second electrode, for example, a positive electrode or a negative electrode used in a publicly known all-solid state battery (e.g., a lithium ion battery) can be applied. The first electrode and the second electrode may respectively include the first electrode layer and the second electrode layer. That is, the first electrode may have a structure in which a first electrode layer containing a first electrode active material is disposed on a current collector. The second electrode may have a structure in which a second electrode layer containing a second electrode active material is disposed on a current collector.

To the solid state electrolyte contained in the solid state electrolyte layer, for example, a solid state electrolyte used in a solid state electrolyte layer of a publicly known all-solid state battery (e.g., a lithium ion battery) can be applied. The solid state electrolyte can be appropriately selected from, for example, materials commonly used in a lithium ion battery. Examples thereof include sulfide solid state electrolyte materials, oxide solid state electrolyte materials, other inorganic solid state electrolyte materials, and organic solid state electrolyte materials. The solid state electrolyte may be used alone or in a combination of greater than or equal to two kinds. The form and the size are not particularly limited, but examples thereof include a fine particle form. When the solid state electrolyte is in a fine particle form, the average particle diameter of the solid state electrolyte may be greater than or equal to 0.01 μm and less than or equal to 15 μm and may be greater than or equal to 0.2 μm and less than or equal to 10 μm. The average particle diameter refers to the D50 evaluated from the volume particle size distribution measured with a laser diffraction scattering particle size distribution meter (i.e., the median diameter of the volume distribution).

The carbon atoms contained in the solid state electrolyte layer are derived from, for example, an organic binder used when the solid state electrolyte layer is formed by the coating process. For example, as the organic binder, a thermoplastic resin can be used, but the organic binder is not particularly limited, and can be appropriately selected from materials used in a publicly known all-solid state battery (e.g., a lithium ion battery). Examples thereof include a thermoplastic elastomer of a styrene-ethylene-butadiene copolymer. Ethyl cellulose and polyvinylidene fluoride can also be used. Other than the foregoing, polyethylene, polypropylene, polyisobutylene, polystyrene, polyvinyl chloride, polyvinyl acetate, poly(methyl methacrylate), poly(ethyl methacrylate), poly(n-propyl methacrylate), poly(n-butyl methacrylate), polydimethylsiloxane, cis-1,4-polybutadiene, polyisoprene, nylon 6, nylon 6,6, polyethylene terephthalate, or polyvinyl alcohol can be used. The binder may be used alone or in a combination of greater than or equal to two kinds.

A specific example of the battery according to the first embodiment is now presented. FIG. 1 is a schematic sectional view of an all-solid state battery which is an example of a battery according to the first embodiment. The all-solid state battery includes current collectors 1, a positive electrode layer 2, a negative electrode layer 3, and a solid state electrolyte layer 4. The positive electrode layer 2 and the negative electrode layer 3 are disposed face-to-face with each other with the solid state electrolyte layer 4 interposed therebetween. The solid state electrolyte layer 4 contains at least a solid state electrolyte and at least carbon atoms. Furthermore, the solid state electrolyte layer 4 includes a carbon unevenly distributed layer 5. In the all-solid state battery, a first electrode is constituted by the current collector 1 and the positive electrode layer 2. A second electrode is constituted by the current collector 1 and the negative electrode layer 3. The current collectors 1 are not particularly limited, and can be appropriately selected from materials used in a publicly known all-solid state battery (e.g., a lithium ion battery).

Second Embodiment

A production method for a battery according to a second embodiment includes:

A forming a first solid state electrolyte layer on a single surface of a first electrode and forming a second solid state electrolyte layer on a single surface of a second electrode;

B forming a first carbon unevenly distributed layer in a surface region of the first solid state electrolyte layer, the first carbon unevenly distributed layer having a concentration of carbon atoms higher than a region of the first solid state electrolyte layer excluding the surface region; and C joining the first carbon unevenly distributed layer of the first solid state electrolyte layer and the second solid state electrolyte layer together.

In the production method for a battery according to the second embodiment, in the B, a second carbon unevenly distributed layer may be formed in a surface region of the second solid state electrolyte layer, the second carbon unevenly distributed layer having a concentration of carbon atoms higher than a region of the second solid state electrolyte layer excluding the surface region, and in the C, the first carbon unevenly distributed layer of the first solid state electrolyte layer and the second carbon unevenly distributed layer of the second solid state electrolyte layer may be joined together.

Figure 2:
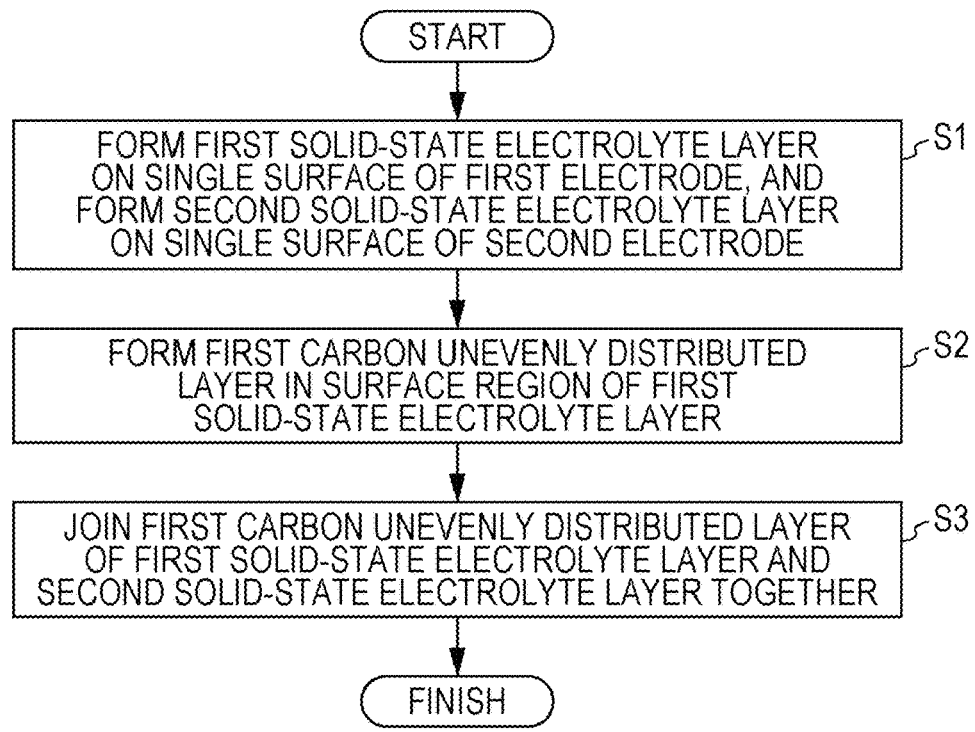
FIG. 2 is a flowchart of a first example of a production method for a battery according to a second embodiment.
Figure 3:
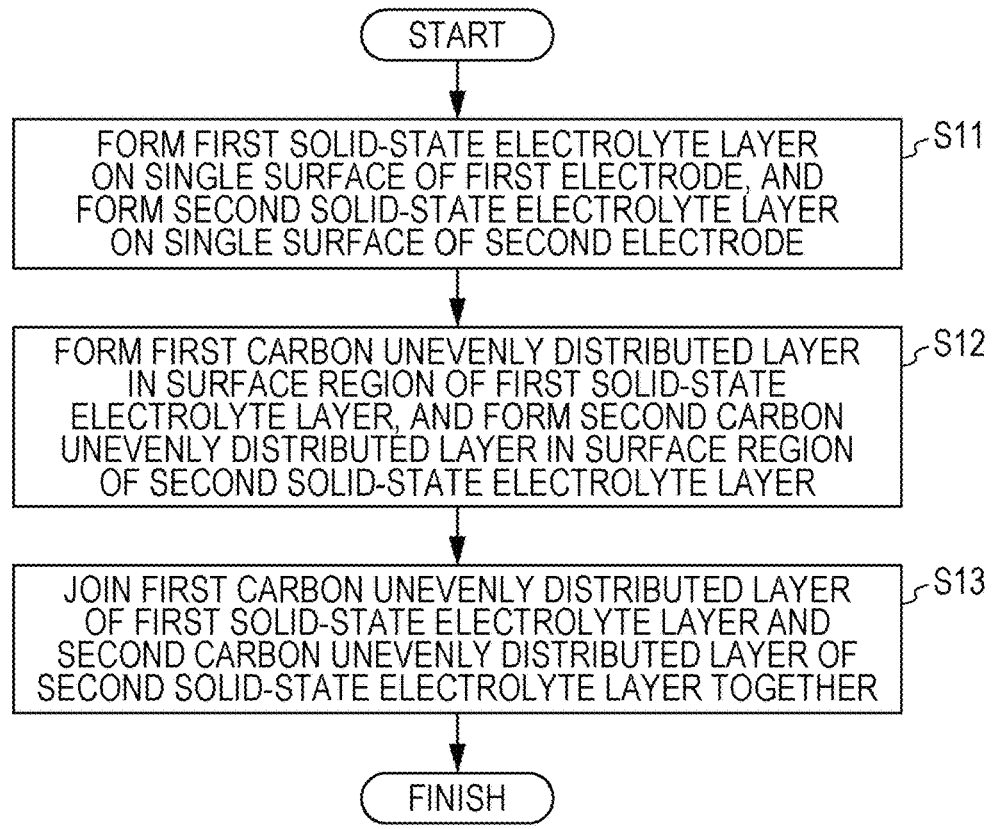
FIG. 3 is a flowchart of a second example of the production method for a battery according to the second embodiment.

FIG. 2 illustrates a flowchart of a first example of the production method for a battery according to the second embodiment. FIG. 3 illustrates a flowchart of a second example of the production method for a battery according to the second embodiment.

As illustrated in FIG. 2, in the first example of the production method for a battery according to the second embodiment, first, a first solid state electrolyte layer is formed on a single surface of a first electrode, and a second solid state electrolyte layer is formed on a single surface of a second electrode (S1). Next, a first carbon unevenly distributed layer is formed in a surface region of the first solid state electrolyte layer (S2). Subsequently, the first carbon unevenly distributed layer of the first solid state electrolyte layer and the second solid state electrolyte layer are joined together (S3).

As illustrated in FIG. 3, in the second example of the production method for a battery according to the second embodiment, first, a first solid state electrolyte layer is formed on a single surface of a first electrode, and a second solid state electrolyte layer is formed on a single surface of a second electrode (S11). Next, a first carbon unevenly distributed layer is formed in a surface region of the first solid state electrolyte layer, and a second carbon unevenly distributed layer is formed in a surface region of the second solid state electrolyte layer (S12). Subsequently, the first carbon unevenly distributed layer of the first solid state electrolyte layer and the second carbon unevenly distributed layer of the second solid state electrolyte layer are joined together (S13).

In accordance with the production method according to the second embodiment, for example, the battery according to the first embodiment can be produced. That is, a battery that can be produced in accordance with the production method according to the second embodiment includes a first electrode, a second electrode, and a solid state electrolyte layer disposed between the first electrode and the second electrode. The solid state electrolyte layer contains at least a solid state electrolyte and at least carbon atoms and includes a carbon unevenly distributed layer. Here, the solid state electrolyte layer is formed by joining a first solid state electrolyte layer and a second solid state electrolyte layer. The carbon unevenly distributed layer is formed from only a first carbon unevenly distributed layer or from a first carbon unevenly distributed layer and a second carbon unevenly distributed layer. The concentration of the carbon atoms in the carbon unevenly distributed layer is higher than the concentration of the carbon atoms in a region of the solid state electrolyte layer excluding the carbon unevenly distributed layer.

Because of including the carbon unevenly distributed layer, the battery that can be produced in accordance with the production method according to the second embodiment, for example, reduces the risk of a short circuit and is capable of realizing high reliability, as described in the first embodiment.

Hereafter, the production method according to the second embodiment will be described in further detail. Here, a method that can produce the battery illustrated in FIG. 1 will be described. That is, a method for producing a battery in which the first electrode is a positive electrode and is constituted by a current collector and an electrode layer (i.e., a positive electrode layer) and the second electrode is a negative electrode and is constituted by a current collector and an electrode layer (i.e., a negative electrode layer) will be described.

The production method for an electrode layer is not particularly limited, and a publicly known technique can be used. An electrode layer is normally formed on a current collector.

The current collector is not particularly limited, and a material commonly used in a lithium ion battery can be used. For example, a copper foil, a copper alloy foil, an aluminum foil, an aluminum alloy foil, or a stainless steel foil can be used.

The active material used in the electrode layer is not particularly limited, and can be selected according to the desired function. Normally, the electrode layer can be formed from a mixture in which an active material and, as needed, a conductive material, a solid state electrolyte, and/or a binder are mixed.

Active materials normally include a positive electrode active material and a negative electrode active material, and each of these can be selected according to the desired function.

Examples of the positive electrode active material include a lithium transition metal oxide, a vanadium oxide, a chromium oxide, and a lithium transition metal sulfide. Examples of the lithium transition metal oxide include a lithium nickel oxide, a lithium manganese oxide, and a lithium cobalt oxide. Examples of the lithium transition metal oxide include $LiCoO_2$, $LiNiO_2$, $LiMnO_2$, $LiMn_2O_4$, $LiNiCoMnO_2$, $LiNiCoO_2$, $LiCoMnO_2$, $LiNiMnO_2$, $LiNiCoMnO_4$, $LiMnNiO_4$, $LiMnCoO_4$, $LiNiCoAlO_2$, $LiNiPO_4$, $LiCoPO_4$, $LiMnPO_4$, $LiFePO_4$, $Li_2NiSiO_4$, $Li_2CoSiO_4$, $Li_2MnSiO_4$, $Li_2FeSiO_4$, $LiNiBO_3$, $LiCoBO_3$, $LiMnBO_3$, and $LiFeBO_3$. Examples of the lithium transition metal sulfide include $LiTiS_2$, $Li_2TiS_3$, and $Li_3NbS_4$. One kind or greater than or equal to two kinds selected from these positive electrode active materials may be used.

Examples of the negative electrode active material include carbon materials, lithium alloys, metal oxides, lithium nitride ($Li_3N$), metallic lithium, and metallic indium. Examples of the carbon materials include artificial graphite, graphite, non-graphitizable carbon, and graphitizable carbon. Examples of the lithium alloys include an alloy of lithium and at least one metal selected from the group consisting of Al, Si, Pb, Sn, Zn, and Cd. Examples of the metal oxides include $LiFe_2O_3$, $WO_2$, $MoO_2$, SiO, and CuO. A mixture or a composite of a plurality of materials may be used as a negative electrode active material.

Each of these positive electrode active materials or negative electrode active materials may be used alone or in a combination of greater than or equal to two kinds. The form and the size are not particularly limited, but examples thereof include a fine particle form. When the active material is in a fine particle form, the average particle diameter thereof may be greater than or equal to 0.5 μm and less than or equal to 20 μm and may be greater than or equal to 1 μm and less than or equal to 15 μm. The average particle diameter refers to the D50 evaluated from the volume particle size distribution measured with a laser diffraction scattering particle size distribution meter (i.e., the median diameter of the volume distribution). When the particle size distribution cannot be measured, the average particle diameter of the particles can be calculated in accordance with the following method. A particle group is observed with an electron microscope, and the area of specific particles in an electronic microscope image is calculated by image processing. When it is impossible to directly observe only a particle group, a structure containing particles is observed with the electron microscope, and the area of specific particles in an electron microscope image is calculated by image processing. The diameter of a circle having the same area as the calculated area is determined to be the diameter of each specific particle. The diameters of an optional number (e.g., 10) of the particles are calculated, and the average value thereof is determined as the average particle diameter of the particles.

The conductive material is not particularly limited, but can be appropriately selected from materials commonly used in a lithium ion battery. Examples thereof include graphites, carbon blacks, conductive fibers, conductive metal oxides, and organic conductive materials. These conductive materials may be used alone or in a combination of greater than or equal to two kinds.

The solid state electrolyte is not particularly limited, but can be appropriately selected from materials commonly used in a lithium ion battery, according to the kind and application of the active material. Examples thereof include sulfide solid state electrolyte materials, oxide solid state electrolyte materials, other inorganic solid state electrolyte materials, and organic solid state electrolyte materials. The solid state electrolyte may be used alone or in a combination of greater than or equal to two kinds. The form and the size are not particularly limited, but examples thereof include a fine particle form. When the solid state electrolyte is in a fine particle form, the average particle diameter thereof may be greater than or equal to 0.01 μm and less than or equal to 15 μm and may be greater than or equal to 0.2 μm and less than or equal to 10 μm. The average particle diameter refers to the D50 evaluated from the volume particle size distribution measured with a laser diffraction scattering particle size distribution meter (i.e., the median diameter of the volume distribution).

As the binder, for example, a thermoplastic resin can be used, but the binder is not particularly limited, and can be appropriately selected from materials commonly used in a lithium ion battery. Examples thereof include a thermoplastic elastomer of a styrene-ethylene-butadiene copolymer. Ethyl cellulose and polyvinylidene fluoride can also be used. Other than the foregoing, polyethylene, polypropylene, polyisobutylene, polystyrene, polyvinyl chloride, polyvinyl acetate, poly(methyl methacrylate), poly(ethyl methacrylate), poly(n-propyl methacrylate), poly(n-butyl methacrylate), polydimethylsiloxane, cis-1,4-polybutadiene, polyisoprene, nylon 6, nylon 6,6, polyethylene terephthalate, or polyvinyl alcohol can be used. The binder may be used alone or in a combination of greater than or equal to two kinds.

The formation method for an electrode layer is not particularly limited, and a publicly known method can be used. A positive electrode active material or a negative electrode active material is, as needed, mixed with, for example, a conductive material, a solid state electrolyte, and/or a binder using a mixer. The mixing proportion of each of the materials is appropriately determined according to, for example, the use application of the battery. The mixer is not particularly limited, but, for example, mixing can be performed according to a publicly known method using a publicly known mixer such as a planetary mixer or a ball mill.

The obtained mixture containing an active material is caused to adhere to a current collector such that a predetermined thickness is achieved.

Examples of another formation method include a method where a slurry in which a mixture containing an active material is dispersed in an appropriate solvent is produced, and the slurry is applied to a current collector and thereafter dried. As the slurry coating method, a common method can be used, and examples thereof include a screen printing method, a die coating method, a spraying method, and a doctor blade method.

Examples of the formation method for the first solid state electrolyte layer include a method where a slurry in which a solid state electrolyte and a binder are dispersed in an appropriate solvent is produced, the slurry is applied to a single surface of a first electrode (here, namely, to a positive electrode layer), and thereafter the obtained coating film is dried. As the slurry coating method, a common method can be used, and examples thereof include a screen printing method, a die coating method, a spraying method, and a doctor blade method. The first solid state electrolyte layer can also be formed by another method such as a method where the slurry is applied to a support material, the obtained coating film is dried, and thereafter the obtained solid state electrolyte sheet is transferred to a single surface of the first electrode (here, namely, to a positive electrode layer). The second solid state electrolyte layer can be formed on a single surface of a second electrode (here, namely, on a negative electrode layer) in the same manner as with the first solid state electrolyte layer.

During drying after the first solid state electrolyte layer is applied to the electrode layer, the binder can be unevenly distributed to a surface region of the first solid state electrolyte layer. Thus, a first carbon unevenly distributed layer can be formed in the surface region of the first solid state electrolyte layer, the first carbon unevenly distributed layer having a concentration of carbon atoms higher than a region of the first solid state electrolyte layer excluding the surface region. Specifically, by using the convection in the thickness direction of the first solid state electrolyte layer under drying, the binder can be unevenly distributed to the surface region. The binder can be unevenly distributed to near the surface by changing the convection status in the thickness direction of the first solid state electrolyte layer, for example, with various heating methods such as hot plate heating, far-infrared heating, and radiation-based heating, a combination of vacuum drying therewith, and changes in conditions such as the drying time and the rate of temperature increase. Other than the foregoing heating methods, continuous heat treatment may be performed using a roller, a conveyor, or a walking beam. To enhance dryness, an air flow can be generated by disposing an air inlet-exhaust port in a drying furnace. When the heat treatment is batch treatment, as described above, using a pump, vacuum drying can be combined therewith. In these various drying methods, the film quality of a dried film can be controlled by changing conditions such as the drying temperature and time, the rate of temperature increase, and the air flow rate.

The same method as with the first carbon unevenly distributed layer can be used when a second carbon unevenly distributed layer is formed in a surface region of the second solid state electrolyte layer as in the production method of the second example described above.

The joining of the first solid state electrolyte layer and the second solid state electrolyte layer can be performed by stacking the first carbon unevenly distributed layer of the first solid state electrolyte layer and a surface of the second solid state electrolyte layer face-to-face with each other or stacking the first carbon unevenly distributed layer of the first solid state electrolyte layer and the second carbon unevenly distributed layer of the second solid state electrolyte layer face-to-face with each other, and pressing the obtained layered body. Due to this pressing, the filling rate of the solid state electrolyte is enhanced and the mutual contact interface between the active material particles and the solid state electrolyte particles is increased, thereby enabling the enhancement of battery performance.

Because the battery produced in accordance with the production method according to the second embodiment includes a carbon unevenly distributed layer present near the joining interface between the first solid state electrolyte layer and the second solid state electrolyte layer, the binder present between the particles further strengthens the adhesive force between the particles. Thus, the collapse of the solid state electrolyte at an end and the occurrence of, for example, a crack in the film at the joining interface are prevented or reduced. Accordingly, with the resulting solid state electrolyte layer having high strength, the battery produced in accordance with the production method according to the second embodiment has a low risk of a short circuit and thus has high reliability.

A production method for a battery includes:
a forming a solid state electrolyte layer on a single surface of a first electrode;
b forming a carbon unevenly distributed layer in a surface region of the solid state electrolyte layer formed on the single surface of the first electrode, the carbon unevenly distributed layer having a concentration of carbon atoms higher than a region of the solid state electrolyte layer excluding the surface region; and
c joining the carbon unevenly distributed layer of the solid state electrolyte layer and a second electrode together.

In this production method as well, the first electrode may be a positive electrode or a negative electrode. In such a method where a solid state electrolyte layer and an electrode are joined, for example, when a solid state electrolyte layer containing a binder is formed on at least one selected from a positive electrode and a negative electrode and thereafter is subjected to face-to-face joint pressing, heating may be performed to enhance joining properties. Here, the heating temperature is preferably higher than the transition temperature of the binder contained in the electrode layer and/or the solid state electrolyte layer. The transition temperature of the binder can be measured using, for example, thermomechanical analysis (TMA), dynamic viscoelasticity measurement (DMA), differential scanning calorimetry (DSC), or differential scanning thermal analysis (DTA).

EXAMPLE

In the present Example, as a solid state electrolyte, a mixture of sulfide solid state electrolytes, namely, $Li_2S$ and $P_2S_5$, was used. As a binder, a styrenic thermoplastic elastomer was used. As the styrenic thermoplastic elastomer, "Tuftec M1913" manufactured by Asahi Kasei Corporation was used. As a solvent for slurry formation, 1,2,3,4-tetrahydronaphthalene was used. These were mixed to thereby obtain a solid state electrolyte slurry. To electrode layers in a square form having a side of 20 mm, the solid state electrolyte slurry was applied such that a thickness of about 100 μm would be achieved, by a printing method using a metal mask.

The drying of the obtained coating film was performed using a drying furnace equipped with a sheathed heater on a side surface thereof by batch drying treatment. The temperature was increased to 100° C. in 20 minutes and thereafter the temperature was retained for 10 minutes. Subsequently, dried samples were retrieved. During drying treatment, continuous air exhaust was performed in the drying furnace with a vacuum pump to create a reduced pressure atmosphere. Through this drying, by using the convection in the thickness direction of each solid state electrolyte layer under drying, the binder was unevenly distributed to a surface of each solid state electrolyte layer. The binder was unevenly distributed to each of both the surface of the solid state electrolyte layer on a positive electrode and the surface of the solid state electrolyte layer on a negative electrode.

The solid state electrolyte layer on the positive electrode layer and the solid state electrolyte layer on the negative electrode layer were stacked face-to-face with each other, and the obtained layered body was pressed in the layered direction at a pressure of 5 t/cm² under heating at 120° C. to thereby form an all-solid state battery.

To confirm the unevenly distributed state of the binder, the all-solid state battery after being subjected to joint pressing was cut with a cutter, the cut section was polished with a CP, and a carbon mapping analysis of the section of the resulting solid state electrolyte layer was performed using an EPMA. The analysis was performed on two optional portions of the battery. FIGS. 4A and 4B present SEM images of the section of the battery formed in Example and the results of the carbon mapping analysis of the section. FIGS. 5A and 5B present the results of the carbon mapping analysis of the section of the battery formed in Example and graphs quantifying the carbon mapping intensity.

In the results of the carbon mapping analysis presented in FIGS. 4A and 4B, the dark-colored portion on the upper side indicates the carbon used in the negative electrode. In the results of the carbon mapping analysis presented in FIGS. 4A and 4B, the dark-colored regions in a particle form that are assembled in a belt form at the central portion of the solid state electrolyte layer indicate unevenly distributed portions having carbon unevenly distributed therein. In the results of the carbon mapping analysis presented in FIGS. 5A and 5B, the dark-colored portion at the left end indicates the carbon used in the negative electrode. In the results of the carbon mapping analysis presented in FIGS. 5A and 5B, the dark-colored regions in a particle form that are assembled in a belt form at the central portion of the solid state electrolyte layer indicate the unevenly distributed portions having carbon unevenly distributed therein.

The results presented in FIGS. 4A and 4B and FIGS. 5A and 5B revealed that, in the all-solid state battery of the present Example, in the solid state electrolyte layer, in a position apart from the electrode layers, near the center in the thickness direction, an unevenly distributed layer of carbon is present. This unevenly distributed layer is not an evenly connected layer but is an assembly of the unevenly distributed portions, the unevenly distributed portions having a size of greater than or equal to several μm and less than or equal to several 10s μm. Thus, the conduction of lithium ions is not largely inhibited. In the graphs quantifying the carbon mapping intensity, which are presented in FIGS. 5A and 5B, the high intensity area at an end of each graph corresponds to the negative electrode containing carbon.

The graphs of FIGS. 5A and 5B revealed that, in the present Example, the carbon concentration in the carbon unevenly distributed layer in the solid state electrolyte layer is at least greater than or equal to 2 times in comparison with that in a non-unevenly distributed portion. These numerical values were obtained by integrating the quantified detected intensity in the thickness direction. Here, the non-unevenly distributed portion refers to a portion having the lowest carbon concentration in a region that is in the solid state electrolyte layer and that is not the carbon unevenly distributed layer.

It was also revealed that when the thickness of the solid state electrolyte layer present between the positive electrode layer and the negative electrode layer is determined to be 100%, the carbon unevenly distributed layer has a thickness of about 30%

It was also revealed that this carbon unevenly distributed layer contains not only carbon but also the solid state electrolyte.

As confirmed in the SEM images of FIGS. 4A and 4B, neither the collapse of nor a crack in the solid state electrolyte was confirmed in the all-solid state battery of the present Example obtained by pressing. Thus, it was confirmed that the battery according to the present disclosure including a solid state electrolyte layer that includes a carbon unevenly distributed layer has high reliability.

The battery according to the present disclosure is a battery having high reliability and can be used as a secondary battery used for various electronic devices and automobiles.

What is claimed is:

1. A battery comprising:
   a first electrode;
   a second electrode; and
   a solid state electrolyte layer disposed between the first electrode and the second electrode, the solid state electrolyte layer containing
   at least a solid state electrolyte and at least carbon atoms and including
   a carbon unevenly distributed layer, wherein:
   a concentration of the carbon atoms in the carbon unevenly distributed layer is higher than a concentration of the carbon atoms in a region of the solid state electrolyte layer excluding the carbon unevenly distributed layer,
   in the solid state electrolyte layer, the carbon unevenly distributed layer is constituted by a region in which a plurality of unevenly distributed portions are two-dimensionally assembled, the unevenly distributed portions having the carbon atoms unevenly distributed therein, and
   the concentration of the carbon atoms in the carbon unevenly distributed layer is greater than 2 times and less than or equal to 10 times the concentration of the carbon atoms in the region of the solid state electrolyte layer excluding the carbon unevenly distributed layer.

2. The battery according to claim 1,
   wherein the carbon unevenly distributed layer is neither in contact with the first electrode nor in contact with the second electrode.

3. The battery according to claim 1,
   wherein the carbon unevenly distributed layer is exposed at a side surface of the solid state electrolyte layer.

4. The battery according to claim 1,
   wherein the carbon unevenly distributed layer has a thickness of greater than or equal to 10 μm and less than or equal to 50 μm.

5. The battery according to claim 1,
wherein the first electrode includes a first electrode layer containing a first electrode active material;
the second electrode includes a second electrode layer containing a second electrode active material; and
the carbon unevenly distributed layer has a thickness of greater than or equal to 0.1 times and less than or equal to 0.5 times a distance between the first electrode layer and the second electrode layer.

6. The battery according to claim 1,
wherein the concentration of the carbon atoms in the carbon unevenly distributed layer is greater than 2 times and less than or equal to 5 times the concentration of the carbon atoms in the region of the solid state electrolyte layer excluding the carbon unevenly distributed layer.

7. The battery according to claim 1,
wherein the carbon unevenly distributed layer contains the solid state electrolyte and the carbon atoms.

8. The battery according to claim 7,
wherein the carbon unevenly distributed layer further contains Li atoms.

9. The battery according to claim 1,
wherein the carbon atoms are derived from an organic compound forming a binder.

10. A production method for a battery, comprising:
forming a first solid state electrolyte layer on a single surface of a first electrode and forming a second solid state electrolyte layer on a single surface of a second electrode, the first and second solid electrolyte layers including a binder;
drying the first solid electrolyte layer for the binder to unevenly distribute in a surface region of the first solid electrolyte layer, thereby forming a first carbon unevenly distributed layer in the surface region of the first solid state electrolyte layer, the first carbon unevenly distributed layer having a concentration of carbon atoms higher than a region of the first solid state electrolyte layer excluding the surface region; and
joining the first carbon unevenly distributed layer of the first solid state electrolyte layer and the second solid state electrolyte layer together.

11. The production method for a battery according to claim 10, further comprising:
drying the second solid state electrolyte layer for the binder to unevenly distribute in a surface region of the second solid state electrolyte layer, thereby forming a second carbon unevenly distributed layer in the surface region of the second solid state electrolyte layer, the second carbon unevenly distributed layer having a concentration of carbon atoms higher than a region of the second solid state electrolyte layer excluding the surface region,
wherein, the first carbon unevenly distributed layer of the first solid state electrolyte layer and the second carbon unevenly distributed layer of the second solid state electrolyte layer are joined together.

12. A production method for a battery, comprising:
forming a solid state electrolyte layer on a single surface of a first electrode, the solid state electrolyte layer including a binder;
drying the solid state electrolyte layer for the binder to unevenly distribute in a surface region of the solid state electrolyte layer, thereby forming a carbon unevenly distributed layer in the surface region of the solid state electrolyte layer formed on the single surface of the first electrode, the carbon unevenly distributed layer having a concentration of carbon atoms higher than a region of the solid state electrolyte layer excluding the surface region; and
joining the carbon unevenly distributed layer of the solid state electrolyte layer and a second electrode together.

* * * * *